United States Patent Office 3,118,745
Patented Jan. 21, 1964

3,118,745
ANTI-STALLING MOTOR FUEL
Edwin C. Knowles, Poughkeepsie, N.Y., Edward L. Kay, Akron, Ohio, and Kenneth L. Dille, Wappingers Falls, N.Y., assignors to Texaco Inc., New York, N.Y., a corporation of Delaware
No Drawing. Filed Jan. 18, 1961, Ser. No. 83,384
5 Claims. (Cl. 44—72)

This invention relates to a volatile gasoline composition of improved anti-stalling properties containing an amine fluoborate. More particularly, it involves the discovery that amine salts of fluoboric acids are effective anti-stalling, anti-icing additives for gasoline.

In a commonly assigned copending application Serial No. 83,177, filed January 17, 1961, in the names of Edward L. Kay and Edwin C. Knowles, and now U.S. Patent 3,076,835, amine salts of tetra-covalent halogen-substituted boron acids are disclosed as novel compounds. The present invention involves the discovery that a particular group of these novel amine salts, namely amine salts of fluoboric acid, are effective anti-stalling, anti-icing additives for volatile gasolines.

The gasoline fuel composition of this invention comprises a substantial concentration of volatile components, and 0.001 to 0.1 weight percent of a primary amine fluoborate of the general formula

$$R\overset{+}{N}H_3\overset{-}{B}F_4$$

wherein R is an aliphatic hydrocarbyl radical containing 8 to 24 carbon atoms or mixtures thereof. The presence of the primary amine fluoborate in prescribed concentration imparts outstanding anti-icing and anti-stalling properties to volatile gasoline compositions.

When internal combustion engines are operated on a gasoline fuel having the desired volatility characteristics for cold weather driving, a stalling problem is encountered during the warm-up period, particularly under cool, humid atmospheric conditions. It has been generally recognized that the cause of repeated engine stalling in cool, humid weather is the formation of ice in the carburetor. Gasoline evaporating in the carburetor has sufficient refrigerating effect to condense and freeze moisture present in the air. Ice particles deposit on the metal surfaces of the carburetor and partially or completely block the air passage between the carburetor throat and the carburetor throttle valve with resulting stalling, particularly when the engine is idling.

The amine fluoborates are particularly useful in highly volatile fuels having a Reid vapor pressure above about 9 which are particularly prone to engine stalling due to ice formation under cool, humid conditions. Stated another way, the additives of this invention are particularly useful in winter gasoline employed in northern portions of the country since such fuels have Reid vapor pressures between about 9 and 13.5 depending upon the area in question.

Primary amine fluoborates are prepared by reaction of a primary amine with fluoboric "acid" which is formed by reacting boron trifluoride with hydrogen fluoride. Fluoboric acid, $HBF_4$, although not isolatable per se, is commercially available in an aqueous solution of approximately 48% $HBF_4$ concentration. Upon addition of an aliphatic primary amine to an aqueous solution of $HBF_4$, the amine fluoborate is formed in a moderately exothermic reaction. The aqueous reaction medium is removed by addition of a hydrocarbon solvent such as benzene which effects separation of an aqueous layer and solution of amine fluoborate in the hydrocarbon solvent. The remaining water in the reaction mixture is removed by azeotropic distillation and the remaining hydrocarbon solvent is stripped from the amine fluoborate.

Primary amines employed in the preparation of amine fluoborates are represented by the formula $RNH_2$ wherein R is an aliphatic hydrocarbyl radical containing 8 to 24 carbon atoms. A minimum of 8 carbon atoms is necessary in the amine reactant to impart the required gasoline solubility to the amine fluoborate. Particularly preferred amines are mixtures of tertiary alkyl primary amines such as a mixture of t-alkyl primary amines containing 11–14 carbon atoms, Primene 81R, and a mixture of t-alkyl primary amine containing 18–24 carbon atoms, Primene JMT. In addition to these primary amine mixtures, individual amines such as lauryl amine, stearyl amine, oleyl amine, myristyl amine and decyl amine are also used in forming the amine fluoborate anti-stalling additives of this invention.

The amine fluoborate salts effective as anti-stalling and anti-icing additives in the gasoline fuels of this invention are exemplified by the following: lauryl amine fluoborate, stearyl amine fluoborate, oleyl amine fluoborate, 2-ethylhexyl amine fluoborate, myristyl amine fluoborate, a $t\text{-}C_{11}\text{-}C_{14}$ alkyl amine fluoborate and a $t\text{-}C_{18}\text{-}C_{24}$ alkyl amine fluoborate.

The $C_8\text{-}C_{24}$ amine fluoborates are effective anti-stalling, anti-icing additives in concentrations of 0.001 to 0.1 weight percent of the gasoline. The preferred amine fluoborate salt concentration falls in the range of 0.001 to 0.02 weight percent. Concentrations of the order of 4 to 32 pounds of salt per thousand barrels of gasoline equivalent to concentrations of 0.0015 to 0.012 weight percent have proven particularly effective in forming fuels of excellent anti-stalling properties.

The action of the amine fluoborates as anti-stalling, anti-icing additives was evaluated in carburetor icing demonstrator apparatus consisting of a vacuum pump equipped so that cooled, moisture-saturated air from an ice "tower" is drawn through a simple glass tube gasoline carburetor. The gasoline sample is placed in a sample bottle and is drawn into the glass carburetor through a hypodermic needle which is usually 20 gauge. Evaporation of the gasoline in the glass tube further cools the cold, moist air with resulting ice formation on the throttle plate. The formation of ice on the throttle plate causes an engine to stall and it has been found that this condition is equivalent to a pressure drop across the throttle plate of about 0.5 inch of mercury, and the time to reach this pressure drop is recorded. The vacuum pump is adjusted to give a vacuum of 1.8 inches mercury and the test is run until a pressure of 2.3 inches mercury has been reached or is run for 300 seconds. Since with most fuels this pressure drop is reached in 1–4 minutes, 300 seconds is the maximum time for a run. A recording of 300 seconds indicates no stall within the test period. Each fuel is run four times in succession and the average is reported. If the differences between runs are great, the glass tube carburetor and test throttle are washed with alcohol and the runs repeated. A leaded winter grade premium gasoline having a Reid vapor pressure of about 13 gives a stall in about 45–65 seconds in this test. Additives which raise the stalling time to over 150 seconds and preferably over 200 seconds are regarded as effective anti-stalling, anti-icing additives.

The base fuel employed to evaluate the effectiveness of amine fluoborates as anti-stalling, anti-icing additives was a winter grade premium gasoline having an octane rating of about 100 and containing 3 cc. of TEL per gallon. This winter grade gasoline, which had a 50 ASTM distillation point of 210 and a Reid vapor pressure of about 13 pounds was ideally suited for testing the effect of amine fluoborates on stalling characteristics because of its high vapor pressure. The base fuel had an average stalling time of 60 seconds in the afore-described stalling test.

In the above described test, aliphatic primary amines containing 8-24 carbon atoms per se were ineffective in improving the anti-stalling, anti-icing properties of the base fuel. For example, the addition of 16 pounds per thousand barrels of a t-$C_{11}$-$C_{14}$ alkyl primary amine mixture (Primene 81R) and a t-$C_{18}$-$C_{24}$ alkyl primary amine mixture (Primene JMT) to the base fuel gave products having average stalling times of 61 and 46 seconds respectively, which values are essentially equivalent to the average stalling time of 60 seconds obtained with the base fuel. The fluoboric acid from which the amine fluoborates are derived is, of course, ineffective as a gasoline additive because of its gasoline insolubility.

In the following table there is shown the effectiveness of amine fluoborates as anti-stalling, anti-icing gasoline additives.

*Action of Amine Fluoborates as Anti-Icing Additives*

| Fluoborate Salts | Concentration, Weight Percent | Stalling Time, Seconds |
| --- | --- | --- |
| Primene JMT Fluoborate | 0.009 | 300+ |
| Do | 0.038 | 244 |
| Primene 81R Fluoborate | 0.0038 | 237 |
| Do | 0.009 | 300+ |

The data in the foregoing table demonstrates the effectiveness of amine fluoborates as anti-stalling, anti-icing gasoline additives. It is also significant that the higher concentration of Primene JMT fluoborate, namely 0.038 (100 pounds per thousand barrels of fuel) was less effective than a concentration within the preferred range, namely 0.009 weight percent (25 pounds per thousand barrels).

In addition to the above demonstrated anti-icing action of amine fluoborates, these additives are also effective in suppressing surface ignition and spark plug fouling in gasoline fuels.

We claim:

1. A gasoline containing 0.001 to 0.1 weight percent of an amine fluoborate of the general formula $$R\overset{+}{N}H_3\overset{-}{B}F_4$$

wherein R is an aliphatic hydrocarbyl radical containing 8 to 24 carbon atoms, said amine fluoborate imparting improved anti-stalling, anti-icing properties to said gasoline.

2. A gasoline according to claim 1 having a Reid vapor pressure above about 9.

3. A gasoline according to claim 1 in which said amine fluoborate is present in a concentration between 0.001 and 0.02 weight percent.

4. A gasoline according to claim 1 in which said amine fluoborate is a t-$C_{11}$-$C_{14}$ alkyl amine fluoborate.

5. A gasoline according to claim 1 in which said amine fluoborate is a t-$C_{18}$-$C_{24}$ alkyl amine fluoborate.

References Cited in the file of this patent

UNITED STATES PATENTS

| | | |
| --- | --- | --- |
| 2,238,069 | Miller | Apr. 15, 1941 |
| 2,611,746 | Kipp | Sept. 23, 1952 |
| 2,958,591 | Jones et al. | Nov. 1, 1960 |
| 2,960,819 | Steinberg et al. | Nov. 22, 1960 |
| 2,978,502 | English et al. | Apr. 4, 1961 |

FOREIGN PATENTS

| | | |
| --- | --- | --- |
| 645,202 | Great Britain | Oct. 25, 1950 |

OTHER REFERENCES

Petroleum Refining With Chemicals, by Kalichevsky et al., Elsevier Pub. Co., 1956, page 480.